US010768361B1

(12) United States Patent
Leibovici et al.

(10) Patent No.: US 10,768,361 B1
(45) Date of Patent: Sep. 8, 2020

(54) SYSTEM FOR MONITORING GRATING FORMATION

(71) Applicant: Facebook Technologies, LLC, Menlo Park, CA (US)

(72) Inventors: Matthieu Charles Raoul Leibovici, Seattle, WA (US); Kavous Jorabchi, Redmond, WA (US); Austin Lane, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/054,943

(22) Filed: Aug. 3, 2018

(51) Int. Cl.
*G02B 6/34* (2006.01)
*G02B 5/18* (2006.01)
*G02B 6/02* (2006.01)

(52) U.S. Cl.
CPC ....... *G02B 6/02123* (2013.01); *G02B 5/1847* (2013.01); *G02B 6/02133* (2013.01); *G02B 6/02195* (2013.01); *G02B 6/34* (2013.01)

(58) Field of Classification Search
None
See application file for complete search history.

(56) References Cited

U.S. PATENT DOCUMENTS

| | | | | | |
|---|---|---|---|---|---|
| 5,822,479 | A | * | 10/1998 | Napier | G02B 6/02138 385/37 |
| 6,847,762 | B2 | * | 1/2005 | Sweetser | G02B 6/02138 385/11 |
| 2003/0186142 | A1 | * | 10/2003 | Deshmukh | G02B 6/02085 430/30 |
| 2004/0005116 | A1 | * | 1/2004 | Sweetser | G02B 6/02138 385/37 |
| 2004/0033018 | A1 | * | 2/2004 | Durkin | G02B 6/02123 385/37 |
| 2005/0037143 | A1 | | 2/2005 | Chou et al. | |
| 2009/0208876 | A1 | | 8/2009 | Hsu et al. | |
| 2019/0170935 | A1 | * | 6/2019 | Tasker | G02B 6/3885 |

OTHER PUBLICATIONS

Hsu et al. ("Fiber Bragg grating sequential UV-writing method with real-time interferometeric side-diffraction position monitoring", Optics Express, vol. 13, No. 10, May 16, 2005). (Year: 2005).*

(Continued)

*Primary Examiner* — Michelle R Connelly
(74) *Attorney, Agent, or Firm* — Fenwick & West LLP

(57) ABSTRACT

A monitoring system monitors changes in an index of refraction of the grating over a time interval that includes the period of time. The monitoring system includes a light source assembly, a probing assembly, a power meter (e.g., a diffraction and/or a transmittance power meter), and a controller. The light source assembly emits a probe beam. The scanning assembly scans the probe beam over an area of the grating. The power meter measures power of a portion of the probe beam that interacts (e.g., is transmitted by or diffracted from) with the area of the grating. The controller determines changes in grating parameters (may be as a function of time) for the grating being formed based in part on measured power readings over the time interval.

17 Claims, 6 Drawing Sheets

(56) References Cited

OTHER PUBLICATIONS

Krug et al. ("Measurement of index modulation along an optical fiber Bragg grating", Optics Letters, vol. 20, No. 17, Sep. 1, 1995). (Year: 1995).*
Liaw et al. ("Fiber Bragg Grating-Based Optical Amplifiers", 2011). (Year: 2011).*
Mavrona et al. ("Intrinsic and photo-induced properties of high refractive index azobenzene based thin films", Optics Materials Express, Feb. 2018). (Year: 2018).*
PCT International Search Report and Written Opinion, PCT Application No. PCT/US2019/045078, dated Nov. 7, 2019, 9 pages.

* cited by examiner

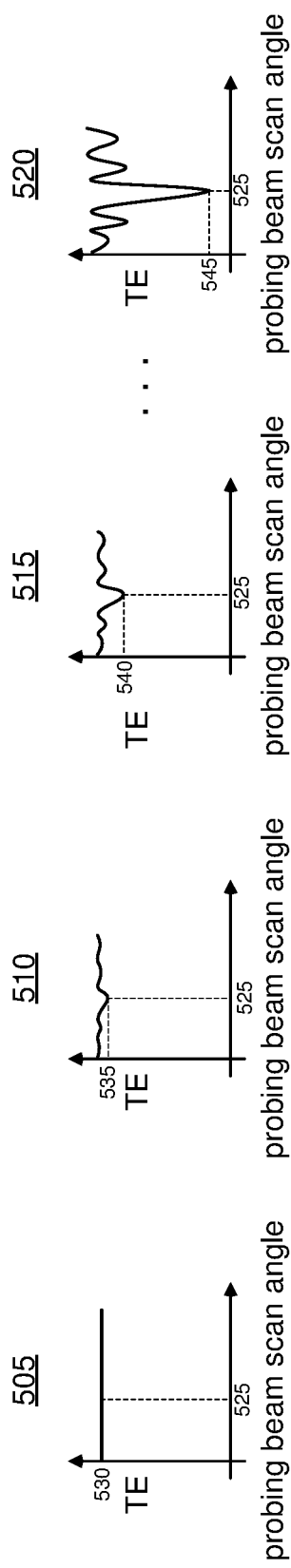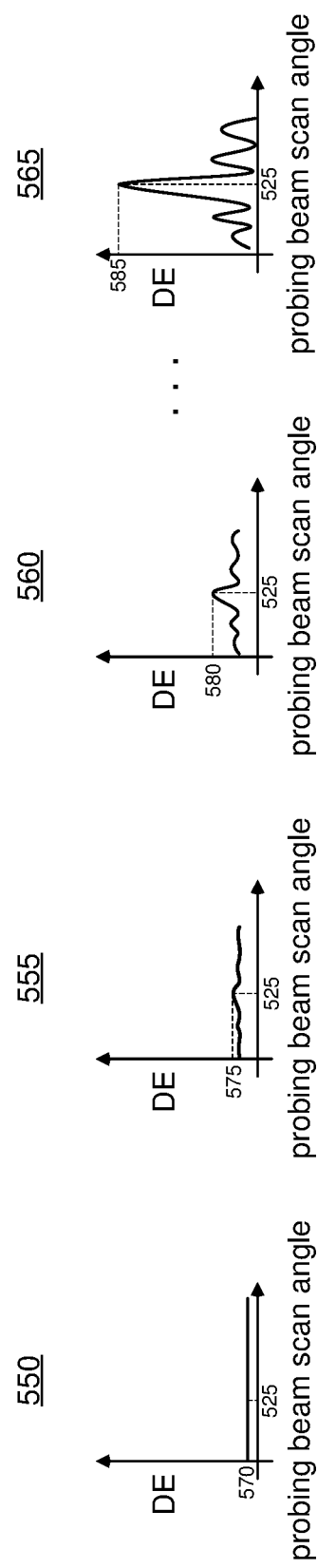
FIG. 5A
FIG. 5B

SYSTEM FOR MONITORING GRATING FORMATION

BACKGROUND

This disclosure relates generally to metrology of an optical component, and more specifically to a system for monitoring grating formation.

Knowing changes in the index of refraction during exposure is valuable in developing new polymer chemistries. In the case of grating multiplexing, it is valuable to know how fast the index of refraction changes in time and what is the smallest resolvable change in the index of refraction.

The conventional method for determining changes in the index of refraction is by acquiring one data point (e.g., light intensity, exposure time, polymer used) by exposing a single sample, and then performing metrology on all the samples one by one. This process is tedious and inefficient.

SUMMARY

A monitoring system includes a light source assembly, a probing assembly, a power meter assembly, and a controller. The power meter assembly may include a reference power meter, a diffraction power meter, a transmittance power meter, a beam splitter, or some combination thereof. In some embodiments, the light source assembly emits a probe beam. The probing assembly scans the probe beam over an area of the grating being formed over a period of time by a grating manufacturing system. A diffraction power meter (of the power meter assembly) measures power of a portion of the probe beam that is diffracted in the area of the grating. In some embodiments, instead of or in addition to the diffraction power meter, the monitoring system includes the transmittance power meter to measure power of a portion of the probe beam that is transmitted through the area of the grating. The controller determines changes in one or more grating parameters (e.g., the index of refraction) for the grating being formed based in part on measured power readings over the time interval, the measured power readings including the power measured by the diffraction power meter. The determined changes in the one or more grating parameters may be as a function of time. In some embodiments, the controller determines changes in the one or more grating parameters as a function of time for the grating being formed based in part on the measured power readings over a time interval that includes the period of time, the measured power readings including the power measured by the transmittance power meter.

In some embodiments, the monitoring system is part of a manufacturing system. The manufacturing system includes a grating manufacturing system configured to form the grating over a period of time.

BRIEF DESCRIPTION OF THE DRAWINGS

FIG. 5A illustrates plots of transmittance efficiency versus probing beam scan angle for scans that occur at different times, according to one or more embodiments.

FIG. 5B illustrates plots of diffraction efficiency versus probing beam scan angle for scans that occur at different times, according to one or more embodiments.

Figure 1:
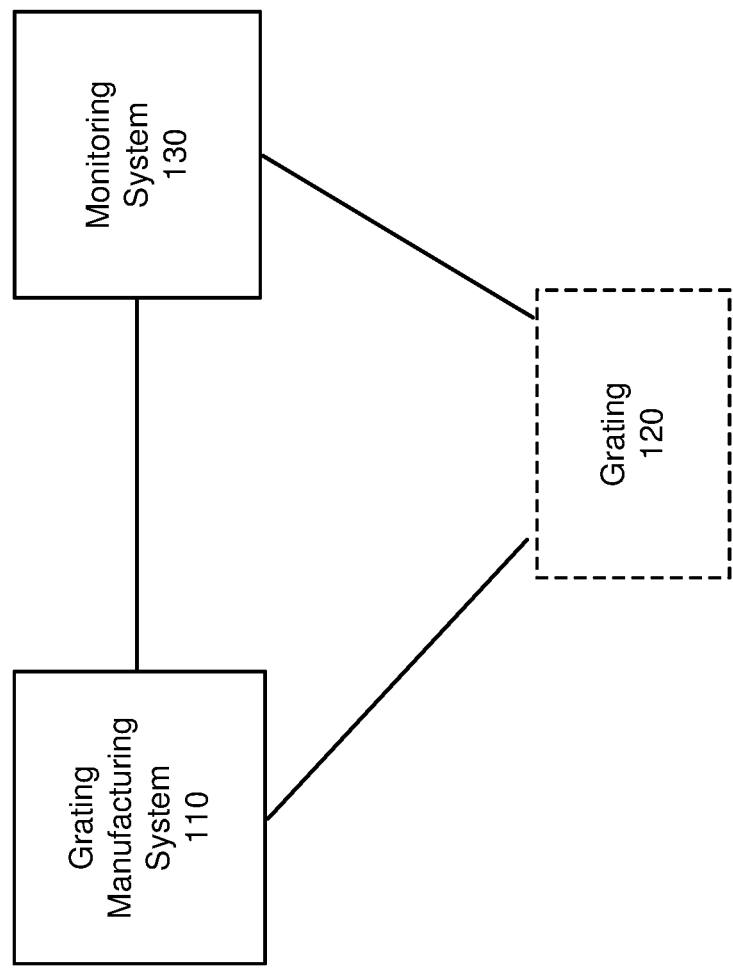
FIG. 1 is a block diagram of a manufacturing system, according to one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Embodiments of the present disclosure relate to a monitoring system for gathering real-time metrology of a grating (e.g., a phase grating, a liquid crystal grating, etc.). The monitoring system may include a light source assembly, a probing assembly, a beam splitter, a power meter assembly, and a controller. The monitoring system interfaces with a grating manufacturing system (e.g., an optical lithography system). For example, the grating manufacturing system may include a means to generate an interference fringe pattern over a surface of a polymer film to form a phase grating. The light from the interference pattern causes a periodic change of index of refraction over some time interval. As the refractive index is changing, a grating is formed.

The light source assembly emits a probe beam that is then scanned in 1-dimension or 2-dimensions by the probing assembly in accordance with instructions from the controller. A portion of the scanned probe beam may be split off (e.g., with the beam splitter) towards a reference power meter, of the power meter assembly, to monitor the initial power of the probe beam. The remaining portion of the scanned beam is scanned across a surface of the polymer film. In some embodiments, some of the scanned beam is transmitted by the polymer film and is detected by a transmittance power meter, of the power meter assembly, and some of the scanned beam is diffracted and is measured by a diffraction power meter of the power meter assembly. The controller uses the power readings to determine grating parameters. Grating parameters describe optical properties of the grating. Grating parameters may include, e.g., how the refractive index of the material (e.g., polymer film) forming the grating changes as a function of time, mean refractive index, thickness of the grating, slant angle of the fringes, Bragg angle, some other parameter that describes optical properties of the grating, or some combination thereof. In some embodiments, the monitoring system may provide feedback to a manufacturing system to facilitate manufacturing of a plurality of optical components. Additionally, while the above example is discussed in terms of a phase grating, it may also apply to other optical components (e.g., a surface relief grating, a liquid crystal grating, etc.).

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

System Architecture

FIG. 1 is a block diagram of a manufacturing system 100, according to one or more embodiments. The manufacturing system 100 manufactures one or more gratings, and can monitor formation of the one or more gratings during manufacture. Accordingly, the manufacturing system 100 manufactures a set of gratings faster and more efficiently than conventional manufacturing systems. The manufacturing system 100 includes a grating manufacturing system 110 and a monitoring system 130. Some embodiments of the manufacturing system 100 have different components than those described here. Similarly, the functions can be distributed among the components in a different manner than is described here.

The grating manufacturing system 110 generates one or more gratings 120. A grating 120 is an optical component with a periodic structure that splits and diffracts light into beams traveling in different directions. The grating 120 may be, e.g., a phase grating, Bragg grating, a surface relief grating, or a liquid crystal grating. The grating manufacturing system 110 includes any equipment that is conventionally used in the manufacturing of a grating. In some embodiments, the grating manufacturing system 110 includes a convection oven, a hot plate, a cool plate, an infrared lamp, a wafer spinner, a mask aligner, an exposure system, a wet bench based developer system, an electron beam lithography, an interference lithography, a multi-photon lithography, a scanning probe lithography, or some combination thereof.

In some embodiments, the grating manufacturing system 110 is based on electron beam lithography in which a focused beam of electrons performs a scanning of a desired shape on a surface covered with an electron-sensitive film. The focused electron beam changes the solubility of the electron-sensitive film resulting in a selective removal of either the exposed or unexposed regions of the electron-sensitive film by immersing in a solvent.

In some embodiments, the grating manufacturing system 110 is based on interference lithography in which an interference pattern consisting of a periodic series of fringes representing intensity minima and maxima between two or more coherent light waves is set up and recorded in a light sensitive material. In some configurations, the grating manufacturing system 110 includes one or more devices performing two-beam interference lithography, a three-beam interference lithography, a four-beam interference lithography, a multi-wave interference lithography, or some combination thereof. Accordingly, the grating manufacturing system 110 may perform a lithographic patterning of an array of patterns with a hexagonal symmetry, a rectangular symmetry, an aperiodic pattern with a defined spatial frequency spectrum, or some combination thereof. For example, the grating manufacturing system 110 generates an infringement pattern (e.g. grating 120) over a surface of a polymer film to form the grating 120. The thickness of the polymer film may range from a few micrometers to hundreds of micrometers.

In some embodiments, the grating manufacturing system 110 is based on multi-photon lithography in which a negative-tone or positive-tone photoresists is illuminated with light from a laser of well-defined wavelength without the use of any complex optical systems. The multi-photon lithography process is based on a multi-photon absorption process in a light-sensitive material that is transparent at the wavelength of the laser for creating the lithographic pattern. By scanning and properly modulating the laser, a chemical change occurs at the focal spot of the laser and can be controlled to create an arbitrary three-dimensional periodic or non-periodic pattern. In a fourth example, the grating manufacturing system 110 is based on scanning probe lithography in which a scanning probe microscope is used for directly writing the desired lithographic pattern on a light-sensitive material using heat, chemical reaction, diffusion, oxidation, electrical bias, mechanical force, or some combination thereof. In some configurations, the grating manufacturing system 110 includes one or more devices performing lithographic patterning on a photo-sensitive material at different locations simultaneously using different types of scanning probe microscope in a parallel fashion for high volume manufacturing.

In some embodiments, the grating manufacturing system 110 includes an imprinting system that performs a mechanical stamping of a pattern on a substrate. In one example, the imprinting system performs a transfer of a pattern onto the substrate based on a removal of a residual polymeric layer and a subsequent removal of features imprinted into the patterned substrate. The grating manufacturing system 110 includes a thermal imprinting system, an ultraviolet imprinting system, a jet and flash imprinting system, a reverse imprinting system, or some combination thereof. The thermal imprinting system is a system that applies a mechanical force on a pre-heated stamp against a thermoplastic polymer that was previously spin-coated on the substrate. The ultraviolet imprinting system is a system that applies an ultraviolet radiation on a low-viscosity, UV-curable polymer (e.g. PDMS, HSQ) to cross-link the polymer followed by releasing the mold from the substrate. The jet and flash imprinting system is a system that dispenses the polymer on the substrate through one or more ink-jets at a low pressure and temperature compared to the thermal imprinting system and the ultraviolet imprinting system. The reverse imprinting system is a system that coats a polymer directly onto a template and releases the patterned substrate by tuning the surface energies of the template and the substrate.

The monitoring system 130 monitors changes in an index of refraction of the grating 120 over a time interval that includes the period of time. The monitoring system 130 is commutatively coupled to the grating manufacturing system 110. The monitoring system 130 generates and provides a report describing grating parameters to the grating manufacturing system 110. As noted above, grating parameters may include, e.g., how the refractive index of the material forming the grating changes as a function of time, mean refractive index, thickness of the grating, slant angle of the fringes, Bragg angle, some other parameter that describes optical properties of the grating, or some combination thereof. The monitoring system 130 is described below with reference to FIG. 2 in detail.

Figure 2:
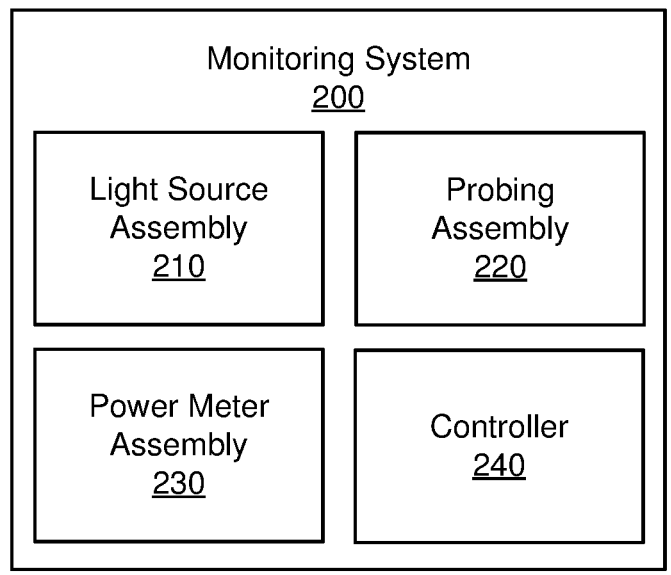
FIG. 2 is a block diagram of a monitoring system, in accordance with an embodiment.

FIG. 2 is a block diagram of a monitoring system 200, according to one or more embodiments. The monitoring system 200 monitors grating formation, and more specifically, monitors changes in an index of refraction of the grating as it forms. The monitoring system 200 includes a light source assembly 210, a probing assembly 220, a power meter assembly, and a controller. Some embodiments of the monitoring system 200 have different components than those described here. Similarly, the functions can be distributed among the components in a different manner than is described here.

The light source assembly 210 includes one or more light sources. A light source emits a probe beam in accordance with instructions from the controller 240. The light source may generate coherent or partially coherent light. The light source may be, e.g., a laser diode, a vertical cavity surface emitting laser, a tunable laser, a light emitting diode, or some combination thereof. The one or more light sources are configured to emit in a first band of light. In some embodiments, the first band of light is coherent, collimated, and monochromatic in order to extract the best data from fitting the measured diffraction efficiency. The wavelength of the first band of light is preferably not absorbed by the sample, such that the exposure of the grating and the first band of light do not interfere. Additionally, the first band of light may satisfy the grating equation. Some wavelengths of light do not diffract at some desired range of angles. In some embodiments, the first band of light is a sub-band (e.g., red light at ~632 nm) of a visible band of light (e.g., ~380 nm to 750 nm). In some embodiments, the probe beam is polarized (e.g., linear or circular). In some embodiments, the probe beam is a continuous beam. In alternate embodiments, the probe beam is pulsed. In some embodiments, the light source assembly 210 may also modulate the probe beam. The light source assembly 210 may, e.g., modulate amplitude, phase, polarization, pulse rate, some other property of the probe beam, or some combination thereof.

The probing assembly 220 scans the probe beam over an area of a grating being formed (e.g., by the grating manufacturing system 110). The probing assembly 220 scans the probe beam in one or more dimensions over an area on the grating being formed in accordance with instructions from the controller 240. The probing assembly 220 includes one or more optical elements that act to scan the probe beam in one or more dimensions. The optical elements may include, e.g., one or more scanning mirrors, one or more microelectromechanical systems (MEMS) mirrors, one or more galvanometric mirrors, one or more diffractive elements, cylindrical lenses, spherical lenses, aspherical lenses, freeform lenses, or some combination thereof. In some embodiments, the probing assembly 220 scans the probe beam in 1-dimension back and forth over a single axis over the area of the grating. In some embodiments, the probing assembly 220 scans the probe beam in 2-dimensions (e.g., along two orthogonal axis) over the area of the grating. For example, the probing assembly 220 may raster scan the probe beam over a rectangular area of the grating being formed. The probing assembly 220 scans the probe beam over the area of the grating at a scanning rate. The scanning rate is faster than a period of time in which the grating is formed. For example, the scanning rate is 200 Hz and the period of time in which the grating is formed is 50 ms. The fast scan rate allows the monitoring system 200 to monitor formation of a grating without affecting the formation of the grating and to probe the grating as if it was an instantaneous scatterometry measurement.

The power meter assembly 230 includes at least one power meter. The power meter assembly 230 may include one or more diffraction power meters, one or more reference power meters, one or more transmittance power meters, one or more beam splitters, or some combination thereof. A diffraction power meter is a power meter that measures optical power of a portion of the probe beam that is diffracted by the grating being formed. As the grating is formed the power of the optical power that is diffracted can increase for a range of angles. A transmittance power meter is a power meter that measures optical power of a portion of the probe beam that is transmitted by the grating being formed. As the grating is formed the power of the optical power that is transmitted decreases for the range of angles (e.g., as an increasingly larger portion of the light is diffracted as the grating forms). Once enough time has elapsed for the grating to form the measured diffraction and the measured transmittance come to a steady state value. A reference power meter is a power meter that measures optical power of the one or more probe beams emitted from the light source assembly 210. The beam splitter (e.g., prism) splits light from the probe beam and/or the diffracted beam to one or more power meters. The diffraction power meter, the transmittance power meter, the reference power meter, and the beam splitter are also described in detail below with reference to FIGS. 3 and 4. Note that in some embodiments (e.g., where a one-dimensional (1D) line or a two-dimensional (2D) area is probed at once), one or more of the power meters may be replaced with 1D or 2D cameras.

The controller 240 controls the light source assembly 210, the probing assembly 220 and the power meter assembly 230. The controller 240 is commutatively coupled to the light source assembly 210. The controller 240 controls e.g., wavelength, frequency, amplitude, brightness, polarization, etc., of the one or more light sources of the light source assembly 210. For example, the controller 240 controls the one or more light sources of the light source assembly to emit light in a first band (e.g., red light).

The controller 240 is commutatively coupled to the probing assembly 220. The controller 240 controls the scanning rate of the scanning mirror of the probing assembly 220. The controller 240 may, e.g., adjust the scanning rate to ensure that it is at least 10 times faster than a time period over which the grating is formed. The controller 240 further controls whether the probe beam is scanned in 1-dimension or 2-dimensions.

The controller 240 is commutatively coupled to the power meter assembly 230. The controller 240 may control gain parameters for the reference power meter, diffraction power meter, and/or transmittance power meter of the power meter assembly 230.

The controller 240 determines changes in the index of refraction of the grating being formed as a function of time based in part on measured power readings. The controller 240 collects power readings from the power meter assembly 230. The controller 240 applies one or models to some or all of the collected power readings (e.g., the power readings from a diffraction power meter, a transmittance power meter, a reference power meter, or some combination thereof) to determine one or more grating parameters (e.g., a change in refractive index of the grating being formed over a time interval). The models include e.g., Kogelnik model, rigorous coupled-wave analysis model, or some combination thereof. The time interval is long enough to encompass a time it takes for the grating to fully form. In this manner, the controller 240 can fully characterize how refractive index changes as a function of time for gratings as they are being formed.

In some embodiments, the controller 240 determines a length of time for the grating to complete formation based at least in part on the determined changes in the index of refraction. As the grating begins to form, starting at time to, an index of refraction of the grating begins to vary (i.e., a rate of change for the index of refraction becomes non-zero). Once the grating approaches being fully formed, the rate of change of index of refraction for the grating being formed reduces and approaches zero. The controller 240 determines that the grating is fully formed by identifying a time value, $t_f$, which corresponds to the change in index of refraction dropping below a threshold value. The threshold value may be, e.g., when the change in index of refraction is less than 1% over 1s. The threshold value may depend on the power of the beam. For example, a more powerful beam can result in a faster exposure. The controller 240 determines an updated time period for grating formation based on the determined time value (e.g., $t_f$-$t_0$).

In some embodiments, the controller 240 provides the updated time period for grating formation to a grating manufacturing system (e.g., the grating manufacturing system 110) and/or a manufacturing system (e.g., the manufacturing system 100). The grating manufacturing system may adjust the period of time to the updated period of time for formation of subsequent grating(s). In some embodiments, the controller 240 responsive to a determination that the grating is formed, the controller 240 instructs the grating manufacturing system to stop formation of the grating, and start formation of a different grating. In this way, the controller 240 can reduce a manufacturing time for a set of gratings.

In some embodiments, the controller 240 generates a report describing the change in index of refraction for the grating as a function of time. The generated report may include one or more plots describing the change in index of refraction for the grating as a function of time, a length of time for the grating to complete formation (i.e., the updated period of time), one or more material parameters describing the grating, a type of scan of the grating (e.g., 1D or 2D), a size of the area being scanned on the grating, some other parameter related to the grating and/or grating being formed, or some combination thereof. The controller 240 may provide (e.g., present via a monitor, email, etc.) the report to a user of the monitoring system 200 system.

Figure 3:
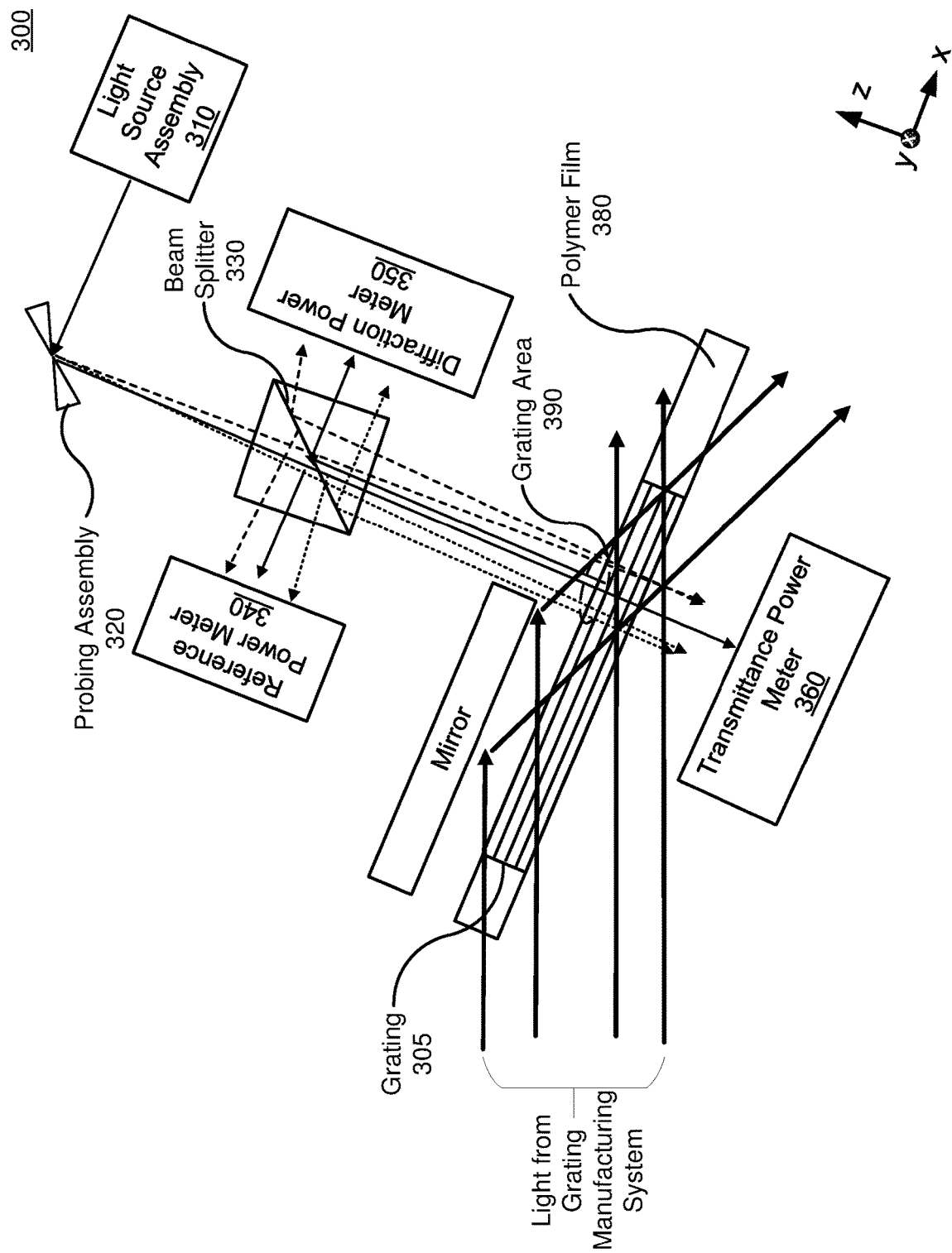
FIG. 3 is a diagram illustrating a portion of a manufacturing system including a monitoring system, according to one or more embodiments.

FIG. 3 is a diagram illustrating a portion 300 of a manufacturing system including a monitoring system, according to one or more embodiments. The monitoring system monitors grating formation, and more specifically, monitors changes in an index of refraction of a grating 305 as it forms. The monitoring system includes a light source assembly 310, a probing assembly 320, a beam splitter 330, a reference power meter 340, a diffraction power meter 350, a transmittance power meter 360, and a controller (not shown in FIG. 3). The light source assembly 310 is an embodiment of the light source assembly 210, the probing assembly 320 is an embodiment of the probing assembly 220, and the beam splitter 330, the reference power meter 340, the diffraction power meter 350, and the transmittance power meter 360 together are an embodiment of the power meter assembly 230, and the controller is an embodiment of the controller 240. Some embodiments of the monitoring system have different components than those described here. Similarly, the functions can be distributed among the components in a different manner than is described here.

In this embodiment, the grating manufacturing system emits coherent light by one or more light sources. For example, the one or more light sources of the grating manufacturing system may emit green light. In the illustrated configuration, a portion of the green light is directed towards a mirror and a portion of the green light is directed towards a polymer film 380. The portion of the green light directed towards the mirror is reflected by the mirror towards the polymer film 380. An interference fringe pattern is generated over the surface of the polymer film 380 to form a grating 305. In the embodiment of FIG. 3, the grating 305 is a phase grating. In alternate embodiments, the grating 305 may be, e.g., a Bragg grating, a surface relief grating, or a liquid crystal grating. The portion of the green light reflected by the mirror and the portion of the green light directed towards the polymer film 380 create an interference pattern over a portion of the polymer film 380. The grating 305 forms over some time interval in the portion of the polymer film 380 where the interference pattern is created. The time interval is material dependent, but typically ranges from about 1 to 100 ms. As the grating 305 is forming, an index of refraction of the grating 305 changes. Changes in the index of refraction over time of the grating 305 are described below with reference to FIGS. 5A-5B in detail.

The light source assembly 310 is an embodiment of the light source assembly 210. The light source assembly 310 includes one or more light sources. The light source assembly 310 is commutatively coupled to the controller. One or more light sources of the light source assembly 310 emit a probe beam in accordance with instructions from the controller. In the embodiment of FIG. 3, the probe beam is red light. In some embodiments, the one or more light sources of the light source assembly 310 emit a probe beam of different wavelengths.

The probing assembly 320 is an embodiment of the probing assembly 220. The probing assembly 320 scans the probe beam over a grating area 390 of the grating 305. The grating area 390 is part of the grating 305. The probing assembly 320 is commutatively coupled to the controller. In the embodiment of FIG. 3, the probe beam from the light source assembly 310 is scanned in 1-dimension by the probing assembly in accordance with instructions from the controller. In alternate embodiments, the probe beam from the light source assembly 310 is scanned in 2-dimensions by the probing assembly 220 in accordance with instructions from the controller. The probing assembly 320 may scan the probe beam along an "X" dimension and/or a "Y" dimension on the grating area 390. The probing assembly 320 may be rotated to change the angle of incidence of the probe beam.

The beam splitter 330 splits a reference portion from the probe beam towards the reference power meter 340. The reference power meter 340 measures power of the reference portion. The controller determines a power of the probe beam based in part on the measured power of the reference portion. The power of the reference portion measured by the reference power meter 340 may be used to improve accuracy of the diffraction power meter 350 and the transmittance power meter 360.

The probe beam emitted by the light source assembly 310 is incident to the surface of the polymer film 380. A portion of the probe beam is diffracted and a portion of the probe beam is transmitted through the area of the grating 390.

The portion of the probe beam that is diffracted passes through the beam splitter 330 before reaching the diffraction power meter 350. The diffraction power meter 350 measures power of the portion of the probe beam that is diffracted in the area of the grating 390.

The transmittance power meter 360 measures power of a portion of the probe beam that is transmitted through the grating area 390. The measured power readings by the power meter assembly include the power measured by the transmittance power meter 360.

In some embodiments, a portion of the probe beam is absorbed and/or reflected/scattered by the polymer film 380. As a result, a sum of the power of the transmitted portion and the power of the diffracted portion may not equal the power of the reference portion. Accordingly, the measurements from the various power meters can be used to determine how much power is absorbed and/or reflected in addition to how much power is diffracted and how much power is transmitted by the grating 305 being formed.

Figure 4:
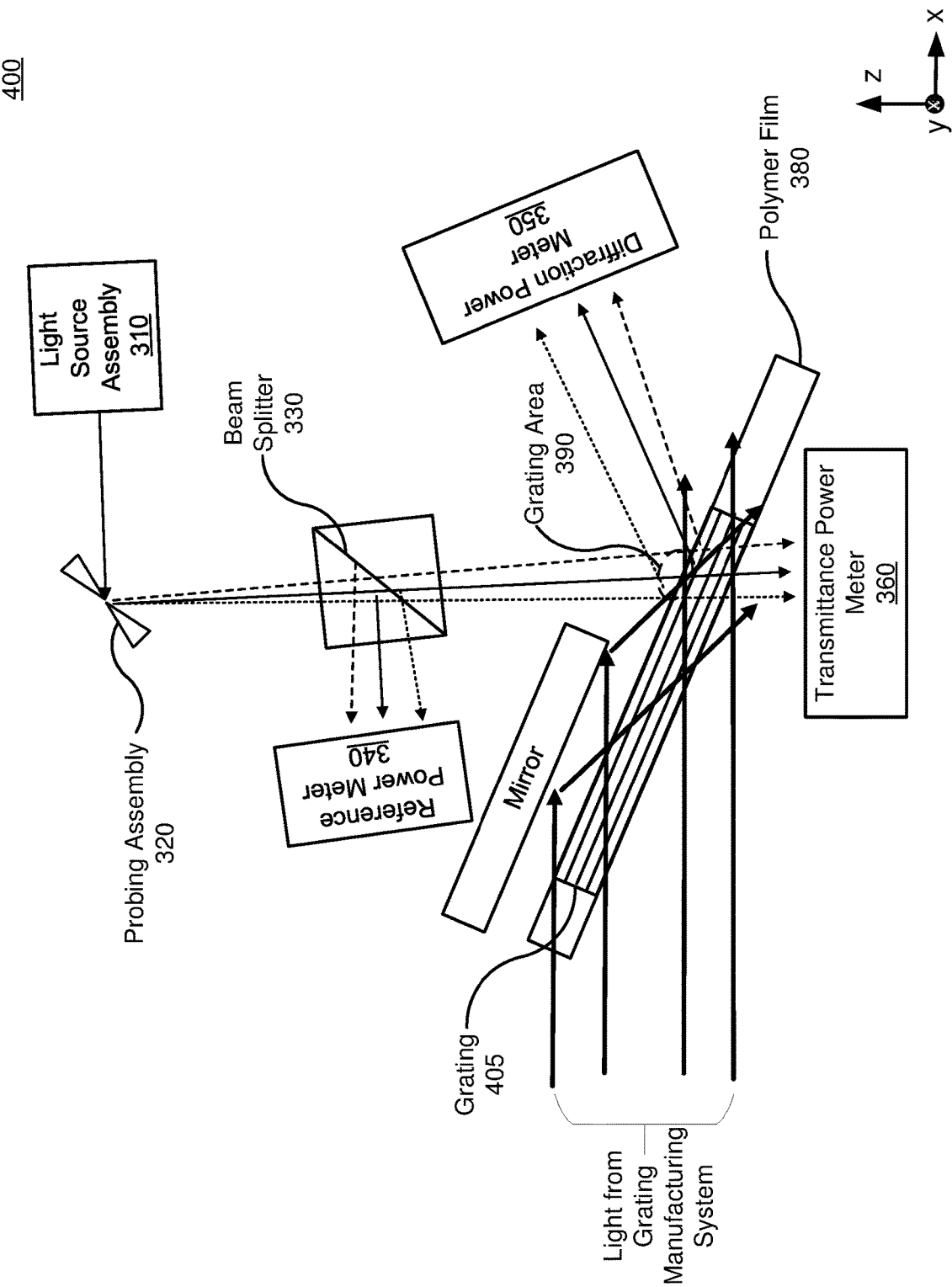
FIG. 4 is a diagram illustrating a portion of a manufacturing system including a monitoring system in an oblique configuration, according to one or more embodiments.

FIG. 4 is a diagram illustrating a portion 400 of a manufacturing system including a monitoring system in an oblique configuration, according to one or more embodiments. The monitoring system monitors grating formation, and more specifically, monitors changes in an index of refraction of a grating 405 as it forms. The monitoring system is substantially the same as the monitoring system in FIG. 3, except that it is an oblique configuration. In an oblique configuration some components of the monitoring system are oriented such that the probe beam exiting the beam splitter 330 has an oblique angle of incidence on the polymer film 380. The oblique angle of incidence causes the portion of the probe beam to be diffracted toward the diffraction power meter 350, and not pass through the beam splitter 330 before reaching the diffraction power meter 350.

Note that the embodiments described above relating to FIGS. 3 and 4 are example implementations, and in other embodiments may be implemented differently.

FIG. 5A illustrates plots 505, 510, 515, and 520 of transmittance efficiency (TE) versus probing beam scan angle for scans that occur at different times, according to one or more embodiments. The portion of the probe beam that is transmitted through the area grating is measured by a transmittance power meter of a power meter assembly (e.g., the power meter assembly 230). As the grating is formed, for certain scan angles the power of the portion of the probe beam that is transmitted through the grating being formed progressively drops. And for certain scan angles, once the grating is formed the majority of beam power is diffracted (v. transmitted).

The plot 505 is a plot of transmittance efficiency versus probing beam scan angle for a scan occurring over a first time interval (e.g., 10 ms). During the first time interval, the grating is not yet formed so there is negligible diffraction. Accordingly, the measured transmittance as a function of scan angle is constant. For example, a probing beam scan angle 525 has a transmittance efficiency 530 that relatively constant.

The plot 510 is a plot of transmittance efficiency versus probing beam scan angle for a scan occurring over a second time interval. The second time interval occurs after the first time interval and is substantially the same length as the first time interval. In plot 510, the measured transmittance efficiency as a function of scan angle starts to vary. Peaks associated with different diffraction orders begin to appear. For example, the probing beam scan angle 525 has a transmittance efficiency 535 that is lower than the transmittance efficiency 530 in plot 505. The reduction in transmittance efficiency is due to an increase in the amount the probe beam is diffracted.

The plot 515 is a plot of transmittance efficiency versus probing beam scan angle for a scan occurring over a third time interval. The third time interval occurs after the second time interval and is substantially the same length as the previous time intervals. In plot 515, the measured transmittance efficiency as a function of scan angle varies. Peaks associated with different diffraction orders continue to appear. For example, the probing beam scan angle 525 has a transmittance efficiency 540 that is lower than the transmittance efficiency 535 in plot 510.

The plot 520 is a plot of transmittance efficiency versus probing beam scan angle for a scan occurring over a fourth time interval. The fourth time interval occurs after the third time interval and is substantially the same length as the previous time intervals. In plot 520, the measured transmittance efficiency as a function of scan angle varies. Peaks associated with different diffraction orders are apparent. For example, the probing beam scan angle 525 has a transmittance efficiency 545 that is close to zero and lower than the transmittance efficiency 540 in plot 515.

FIG. 5B illustrates plots 550, 555, 560, 565 of diffraction efficiency versus probing beam scan angle for scans that occur at different times, according to one or more embodiments. A portion of the beam that is diffracted by a grating area (e.g., the grating area 390) is measured by the diffraction power meter, as described above with reference to FIGS. 3 and 4. As the grating is formed, for certain scan angles the power of the portion of the probe beam that is diffracted by the grating progressively increases. And for certain scan angles, once the grating is formed the majority of beam power is diffracted (v. transmitted).

The plot 550 is a plot of diffraction efficiency versus probing beam scan angle for a scan occurring over a first time interval (e.g., 10 ms). During the first time interval, the grating is not yet formed so there is negligible diffraction. Accordingly, the measured diffraction as a function of scan angle is constant. For example, a probing beam scan angle 525 has a diffraction efficiency 570 that relatively constant and close to zero.

The plot 555 is a plot of diffraction efficiency versus probing beam scan angle for a scan occurring over a second time interval. The second time interval occurs after the first time interval and is substantially the same length as the first time interval. In plot 555, the measured diffraction efficiency as a function of scan angle starts to vary. Peaks associated with different diffraction orders begin to appear. For example, the probing beam scan angle 525 has a transmittance efficiency 575 that is higher than the diffraction efficiency 570 in plot 550. The increase in diffraction efficiency is due to an increase in the amount the probe beam is diffracted.

The plot 560 is a plot of diffraction efficiency versus probing beam scan angle for a scan occurring over a third time interval. The third time interval occurs after the second time interval and is substantially the same length as the previous time intervals. In plot 560, the measured diffraction efficiency as a function of scan angle varies. Peaks associated with different diffraction orders continue to appear. For example, the probing beam scan angle 525 has a transmittance efficiency 580 that is higher than the diffraction efficiency 580 in plot 555.

The plot 565 is a plot of diffraction efficiency versus probing beam scan angle for a scan occurring over a fourth time interval. The fourth time interval occurs after the third time interval and is substantially the same length as the previous time intervals. In plot 565, the measured diffraction efficiency as a function of scan angle varies. Peaks associated with different diffraction orders are apparent. For example, the probing beam scan angle 525 has a transmittance efficiency 585 that is significantly higher (e.g., may be close to 100%) than the diffraction efficiency 580 in plot 560.

In some embodiments, the controller determines a length of time for the grating to complete formation based at least in part on the determined changes in the index of refraction and provides the time to the grating manufacturing system. The grating manufacturing system adjusts the period of time to the length of time for formation of subsequent grating.

In some embodiments, the controller determines that the grating is formed based at least in part on the determined changes in the index of refraction and responsive to the determination that the grating is formed, instructs the manufacturing system to stop formation of the grating, and start formation of a different grating.

Example Method for Metrology of a Grating

Figure 6:
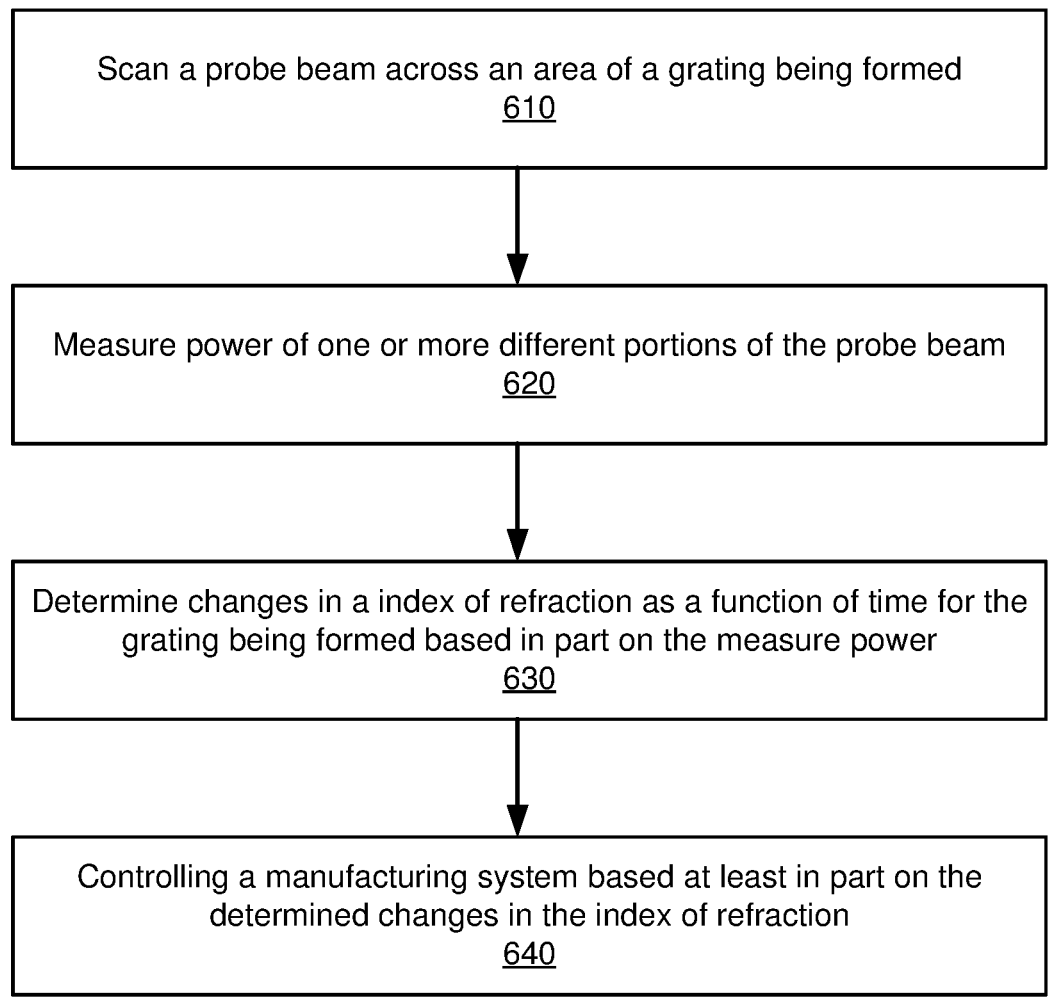
FIG. 6 is flow chart illustrating a process for monitoring grating formation as a function of time, according to one or more embodiments.

FIG. 6 is flow chart illustrating a process 600 for monitoring grating formation as a function of time, according to one or more embodiments. In one embodiment, the process of FIG. 6 is performed by the monitoring system 200. Other entities may perform some or all of the steps of the process in other embodiments. Likewise, embodiments may include different and/or additional steps, or perform the steps in different orders.

The monitoring system 200 scans 610 scans 610 a probe beam across an area of a grating being formed. A probe beam is emitted by a light source assembly 210 and is scanned using a probing assembly 220 over the area of the grating being formed. The monitoring system 200 may scan the probe beam in 1-D or 2-D over the area of the grating being formed.

The monitoring system 200 measures 620 power of one or more different portions of the probe beam. The monitoring system 200 measures the power of the one or more different portions of the probe beam using the power meter assembly 210. For example, a power meter assembly of the monitoring system includes at least a diffraction power meter and/or a transmittance power meter. The power meter assembly may also include a reference power meter. The reference power meter can be used to determine a total power of the probe beam. The diffraction power meter can measure a power of portion of the probe beam that is diffracted by the grating being formed. And the transmittance power meter can measure a power of a portion of the probe beam that is transmitted by the grating being formed.

The monitoring system determines 630 changes in an index of refraction as a function of time for the grating being formed based in part on the measure power. The monitoring system applies (via a controller) one or more models (e.g., Kogelnik model, coupled-wave analysis model, etc.) to the measured power of the one or more different portions of the probe beam to determine the change in index of refraction as a function of time.

The monitoring system controls 640 a manufacturing system based in part on the determined changes in the index of refraction. The controller of the monitoring system determines a length in time for the grating to complete formation based in part on the determined rate of change of the index of refraction dropping below some threshold value. In some embodiments, controller provides the length of time to the grating manufacturing system. And in some cases, responsive to the determination that the grating is formed, instructs the manufacturing system to stop formation of the grating, and start formation of a different grating.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A manufacturing system comprising:
    a grating manufacturing system configured to form a grating over a period of time;
    a monitoring system configured to monitor changes in an index of refraction of the grating as a function of time over a time interval that includes the period of time, the monitoring system comprising:
        a light source assembly configured to emit a probe beam;

a probing assembly configured to scan the probe beam over an area of the grating;

a beam splitter configured to split a reference portion from the probe beam;

a reference power meter configured to measure reference power of the reference portion;

a diffraction power meter configured to measure diffraction power of a diffraction portion of the probe beam that is diffracted in the area of the grating;

a transmittance power meter configured to measure transmittance power of a transmittance portion of the probe beam that is transmitted through the area of the grating; and a controller configured to determine changes in the index of refraction as a function of time for the grating being formed based in part on the measured diffraction power, the measured transmittance power, and the measured reference power over the time interval.

2. The manufacturing system of claim 1, wherein the controller is further configured to:

determine a length of time for the grating to complete formation based at least in part on the determined changes in the index of refraction; and provide the length of time to the grating manufacturing system, wherein the grating manufacturing system is configured to adjust the period of time to the length of time for formation of subsequent grating.

3. The manufacturing system of claim 1, wherein the controller is further configured to:

determine that the grating is formed based at least in part on the determined changes in the index of refraction; and responsive to the determination that the grating is formed, instruct the manufacturing system to stop formation of the grating, and start formation of a different grating.

4. The manufacturing system of claim 1, wherein the diffraction portion of the probe beam that is diffracted passes through the beam splitter before reaching the diffraction power meter.

5. The manufacturing system of claim 1, wherein the grating is selected from a group consisting of: a phase grating, Bragg grating, a surface relief grating, and a liquid crystal grating.

6. The manufacturing system of claim 1, wherein the probing assembly is configured to scan the probe beam in one or more dimensions over the area of the grating.

7. The manufacturing system of claim 1, wherein the probing assembly is configured to scan the probe beam over the area of the grating at a rate that is faster than the time period, wherein the time period is a time over which the grating is formed.

8. The manufacturing system of claim 7, wherein the rate is approximately 200 Hz and the time over which the grating is formed is approximately 50 ms.

9. The manufacturing system of claim 1, wherein the controller is configured to:

generate a report describing the change in the index of refraction for the grating; and provide the report to a user of the manufacturing system.

10. A monitoring system comprising:

a light source assembly that is configured to emit a probe beam;

a probing assembly that is configured to scan the probe beam over an area of a grating being formed over a period of time by a grating manufacturing system;

a beam splitter configured to split a reference portion from the probe beam;

a reference power meter configured to measure reference power of the reference portion;

a diffraction power meter configured to measure diffraction power of a diffraction portion of the probe beam that is diffracted in the area of the grating;

a transmittance power meter configured to measure power of a transmittance portion of the probe beam that is transmitted through the area of the grating; and a controller configured to determine changes in an index of refraction as a function of time for the grating being formed based in part on measured power readings over a time interval that includes the period of time, the measured power readings including the power measured by the reference power meter, the diffraction power meter, and the transmittance power meter.

11. The monitoring system of claim 10, wherein the controller is further configured to:

determine a length of time for the grating to complete formation based at least in part on the determined changes in the index of refraction; and provide the length of time to the grating manufacturing system, wherein the grating manufacturing system is configured to adjust the period of time to the length of time for formation of subsequent grating.

12. The monitoring system of claim 10, wherein the controller is further configured to:

determine that the grating is formed based at least in part on the determined changes in the index of refraction; and responsive to the determination that the grating is formed, instruct the manufacturing system to stop formation of the grating, and start formation of a different grating.

13. The monitoring system of claim 10, wherein the portion of the probe beam that is diffracted passes through the beam splitter before reaching the diffraction power meter.

14. The monitoring system of claim 10, wherein the probing assembly is configured to scan the probe beam in 2-dimensions over the area of the grating.

15. The monitoring system of claim 10, wherein the probing assembly is configured to scan the probe beam over the area of the grating at a rate that is faster than the time period, wherein the time period is a time over which the grating is formed.

16. The monitoring system of claim 15, wherein the rate is approximately 200 Hz and the time over which the grating is formed is approximately 50 ms.

17. The monitoring system of claim 10, wherein the controller is configured to:

generate a report describing the change in the index of refraction for the grating as a function of time; and provide the report to a user of the manufacturing system.

* * * * *